United States Patent
Utsumi

(10) Patent No.: US 10,864,894 B2
(45) Date of Patent: Dec. 15, 2020

(54) WIPER DEVICE

(71) Applicant: DENSO CORPORATION, Kariya (JP)

(72) Inventor: Akihiro Utsumi, Kosai (JP)

(73) Assignee: DENSO CORPORATION, Kariya (JP)

( * ) Notice: Subject to any disclaimer, the term of this patent is extended or adjusted under 35 U.S.C. 154(b) by 19 days.

(21) Appl. No.: 16/334,306

(22) PCT Filed: Dec. 19, 2017

(86) PCT No.: PCT/JP2017/045608
§ 371 (c)(1),
(2) Date: Mar. 18, 2019

(87) PCT Pub. No.: WO2018/135218
PCT Pub. Date: Jul. 26, 2018

(65) Prior Publication Data
US 2019/0217819 A1  Jul. 18, 2019

(30) Foreign Application Priority Data

Jan. 20, 2017 (JP) ................................. 2017-008900
Jan. 26, 2017 (JP) ................................. 2017-012213

(51) Int. Cl.
*H02P 6/14* (2016.01)
*B60S 1/08* (2006.01)
(Continued)

(52) U.S. Cl.
CPC ........... *B60S 1/0807* (2013.01); *B60S 1/0814* (2013.01); *B60S 1/0818* (2013.01); *B60S 1/46* (2013.01);
(Continued)

(58) Field of Classification Search
CPC .... B60S 1/0807; B60S 1/0814; B60S 1/0818; B60S 1/46; H02P 6/15; H02P 29/60; H02P 29/68; H02P 27/08; H02P 29/027
(Continued)

(56) References Cited

U.S. PATENT DOCUMENTS 8,948,964 B2 * 2/2015 Pan ..................... B60H 1/3208
701/36
2002/0126015 A1 * 9/2002 Ishikawa ............... B60S 1/0818
340/601
(Continued)

FOREIGN PATENT DOCUMENTS

JP    H08-265919 A    10/1996
JP    2002-300792 A   10/2002
(Continued)

OTHER PUBLICATIONS

Apr. 3, 2018 International Search Report issued in International Patent Application No. PCT/JP2017/045608.

*Primary Examiner* — Eduardo Colon Santana
*Assistant Examiner* — Zemenay T Truneh
(74) *Attorney, Agent, or Firm* — Oliff PLC

(57) ABSTRACT

A wiper device including a wiper motor that includes a rotor and a coil to generate a rotating magnetic field, and that causes a wiper blade to perform a wiping operation by rotating the rotor according to the rotating magnetic field, a drive section that drives rotation of the wiper motor by performing current switch-on in the coil so as to generate the rotating magnetic field, and a controller that controls the drive section by a timing for current switch-on in the coil based on at least a rotation position of the rotor.

9 Claims, 12 Drawing Sheets

(51) Int. Cl.
    H02P 29/024   (2016.01)
    H02P 27/08    (2006.01)
    H02P 29/60    (2016.01)
    H02P 29/68    (2016.01)
    B60S 1/46     (2006.01)
    H02P 6/15     (2016.01)
    H02P 6/08     (2016.01)

(52) U.S. Cl.
    CPC ............... *H02P 6/15* (2016.02); *H02P 27/08* (2013.01); *H02P 29/027* (2013.01); *H02P 29/60* (2016.02); *H02P 29/68* (2016.02); *H02P 6/08* (2013.01)

(58) Field of Classification Search
    USPC ........................................ 318/445; 15/250.12
    See application file for complete search history.

(56) References Cited

U.S. PATENT DOCUMENTS

| | | | |
|---|---|---|---|
| 2015/0082575 A1* | 3/2015 | Kimura | H02P 6/08 15/250.12 |
| 2017/0222581 A1 | 8/2017 | Kimura et al. | |
| 2017/0324357 A1 | 11/2017 | Kimura et al. | |

FOREIGN PATENT DOCUMENTS

| | | |
|---|---|---|
| JP | 2015-126547 A | 7/2015 |
| WO | 2013/157558 A1 | 10/2013 |

* cited by examiner

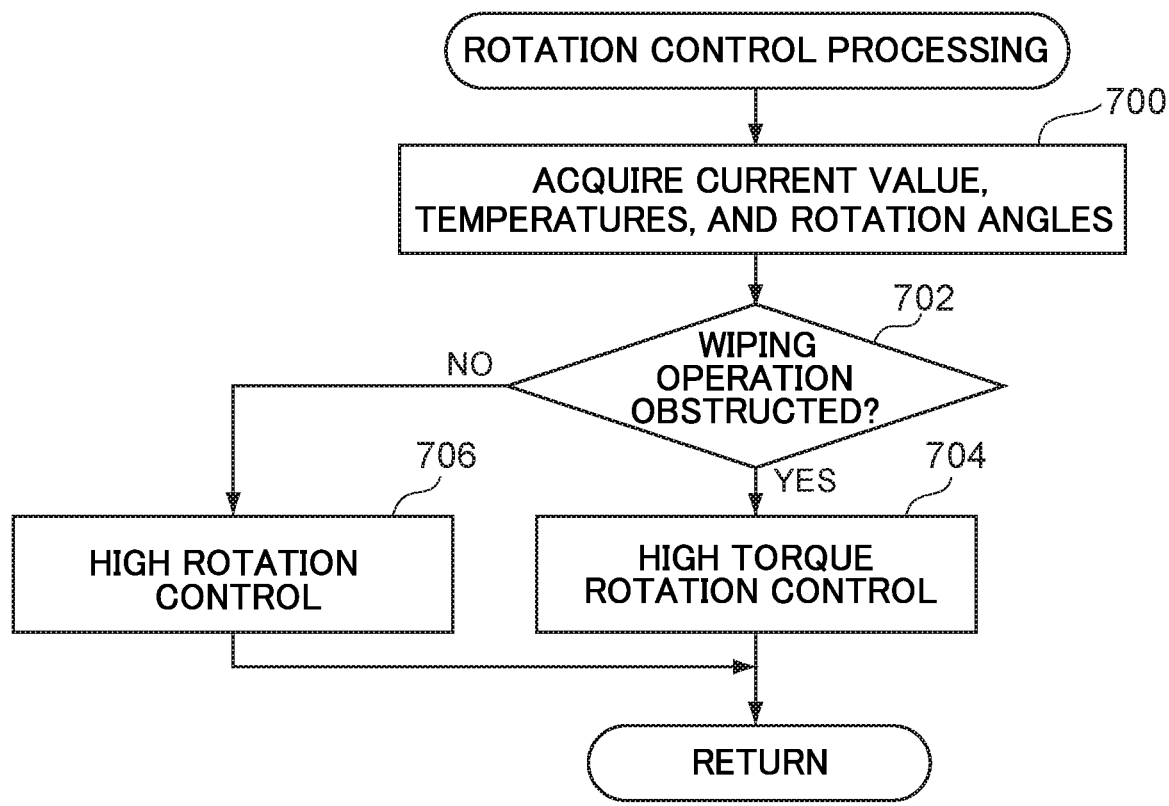

WIPER DEVICE

TECHNICAL FIELD

The present disclosure relates to a wiper device.

BACKGROUND ART

A brushless DC motor employing a permanent magnet as a rotor and employing an electromagnet (coil) as a stator may be employed as a wiper motor used to drive a wiper device. Generally a property of brushless DC motors that are synchronous motors is that although the revs of the rotor increases as the voltage applied to the coil increases, the torque of an output shaft provided at the center of the rotor decreases in such situations. A property of brushless DC motors is that the current flowing in the motor coil (hereafter abbreviated to "motor current") is affected by the torque of the output shaft. Moreover, a property of brushless DC motors in a high load state in which rotation of the output shaft is hampered by the action of an external force is that although the revs of the output shaft decreases, the torque of the output shaft increases in such situations.

The voltage applied to the coil of a brushless DC motor is generated by pulse width modulation (PWM). PWM transforms a direct current power source voltage into an effective voltage by transforming the power source voltage into a pulse-shaped square waveform by switching a switching element ON and OFF. In brushless DC motors the rotation speed of the output shaft is varied by changing the voltage applied to the coil using PWM.

Varying the torque to the output shaft of a brushless DC motor is difficult to achieve solely by changing the voltage using PWM.

FIG. 12 is an explanatory diagram illustrating how the revs (rotation speed) of an output shaft and the current flowing through a wiper motor coil changes with respect to torque of the output shaft in a generic brushless DC motor. As illustrated by the straight line 296R in FIG. 12 illustrating a relationship between torque of the output shaft and the revs of the output shaft, the revs of the output shaft decreases as the torque of the output shaft increases.

In wiper devices, one example of an external force acting on the output shaft of the wiper motor is the resistance to a wiping operation of accumulated snow on a windshield glass. When the wiping operation by a wiper blade driven by the wiper motor is obstructed by accumulated snow, the wiper motor becomes overloaded, and the current flowing through the wiper motor coil (hereafter abbreviated to "motor current") increases. As illustrated by the straight line 296I in FIG. 12 illustrating a relationship between torque of the output shaft and the motor current, as the torque increases, heat generation and power consumption of the wiper motor increase. There is also a concern of damage to the wiper motor and drive circuits of the wiper motor if the motor current exceeds the rating of the wiper motor.

As illustrated in FIG. 12, at a snow-clearing operation point Pβ corresponding to the torque required when clearing snow, the motor current reaches a value illustrated as a snow-clearing motor current I5. There is a concern this may exceed permissible current values within a normal wiping operation range 98.

For example, Japanese Patent Application Laid-Open (JP-A) No. 2015-126547 discloses an invention relating to a wiper device in which the torque of an output shaft of the brushless DC motor is increased by changing a duration of voltage application to a brushless DC motor coil.

SUMMARY OF INVENTION

Technical Problem

However, the technology disclosed in JP-A No. 2015-126547 is directed towards eliminating torque ripple, this being torque fluctuations during rotation of a brushless DC motor rotor. If the torque of the output shaft of the brushless DC motor were to be increased, then the motor current would increase, and there would therefore be a concern of the brushless DC motor becoming overloaded and overheating.

FIG. 8 is an explanatory diagram illustrating how revs (rotation speed) of an output shaft and motor current change with respect to torque of the output shaft in a generic brushless DC motor. As illustrated by the straight lines 96R, 98R in FIG. 8 illustrating relationships between the output shaft torque and the output shaft revs, even though the rotation speed differs between the revs R3 on the straight line 96R and the revs R4 on the straight line 98R, for the same output shaft torque the motor current will be substantially the same, i.e. I3. According to FIG. 8, in order to secure the necessary torque, the same motor current flows through the coil as when the output shaft rotation speed is a high speed even when the output shaft rotation speed is a low speed, thereby increasing the heat generation and power consumption of the motor. A concern of damage to the motor or to drive circuits of the motor accordingly arises if the motor current exceeds the rating for the motor.

In consideration of the above circumstances, the present disclosure provides a wiper device that is capable of controlling the rotation speed of an output shaft of a wiper motor from a low speed region to a high speed region while also suppressing power consumption and preventing overheating of the wiper motor by suppressing the load on the wiper motor.

Moreover, the present disclosure provides a wiper device capable of raising the torque of the output shaft of the wiper motor while suppressing power consumption and preventing overheating of the wiper motor by suppressing the load on the wiper motor.

Solution to Problem

A wiper device of a first aspect of the present disclosure includes a wiper motor that includes a rotor and a coil to generate a rotating magnetic field, and that causes a wiper blade to perform a wiping operation by rotating the rotor according to the rotating magnetic field, a drive section that drives rotation of the wiper motor by performing current switch-on in the coil so as to generate the rotating magnetic field, and a controller that controls the drive section. The controller controls the drive section by a timing for current switch-on in the coil based on at least a rotation position of the rotor.

In this wiper device, the drive section is controlled by the timing for current switch-on in the coil based on at least a rotation position of the rotor. Rotation of the wiper motor can accordingly be controlled by using an appropriate timing according to the rotation position of the rotor, enabling the motor current flowing in the coil to be controlled appropriately, and enabling the load on the wiper motor to be suppressed.

A wiper device of a second aspect of the present disclosure is the wiper device of the first aspect of the present disclosure, wherein in a case in which a speed command is for a first rotation speed, the controller controls the drive section so as to perform first rotation control in which current switch-on in the coil is performed at a timing corresponding to a rotation position of the rotor. The controller controls the drive section so that at least one control is performed of second rotation control in a case in which the speed command is for a second rotation speed that is faster than the first rotation speed, or third rotation control in a case in which the speed command is for a third rotation speed that is slower than the first rotation speed. In the second rotation control, current switch-on in the coil is performed at an effective voltage that is higher than a voltage in the first rotation control and at a timing advanced in electrical angle with respect to the timing of the first rotation control. In the third rotation control, current switch-on in the coil is performed at an effective voltage that is lower than the voltage in the first rotation control and at a timing lagging in electrical angle with respect to the timing of the first rotation control.

In this wiper device, high speed rotation of the output shaft is accommodated by raising the effective voltage of the current switch-on to the wiper motor coil and advancing the timing for current switch-on, and high torque, low speed rotation of the output shaft is accommodated by lowering the effective voltage of the current switch-on to the wiper motor coil and retarding the timing for current switch-on. This suppresses the load on the wiper motor and enables the rotation speed of the output shaft of the wiper motor to be controlled from a low speed region to a high speed region.

A wiper device of a third aspect of the present disclosure is the wiper device of the second aspect of the present disclosure, further including a temperature detection section that detects a temperature of the drive section. The controller controls the drive section such that the third rotation control is performed in a case in which the temperature has exceeded a predetermined threshold temperature during a wiping operation by the wiper blade.

In this wiper device, the third rotation control corresponding to low speed rotation is performed in a case in which the temperature of a circuit of the drive section has reached the threshold temperature or higher. This prevents the wiper motor from becoming overloaded.

A wiper device of a fourth aspect of the present disclosure is the wiper device of the second aspect of the present disclosure, further including a current detection section that detects a current value of the coil. The controller controls the drive section such that the third rotation control is performed in a case in which the current value is a predetermined threshold value or greater during a wiping operation by the wiper blade.

In this wiper device, the third rotation control corresponding to low speed rotation is performed in a case in which the current of the wiper motor coil has reached the predetermined threshold value or greater. This prevents the wiper motor from becoming overloaded.

A wiper device of a fifth aspect of the present disclosure is the wiper device of the second aspect of the present disclosure, wherein in a case in which a difference between the second rotation speed indicated by the speed command and a present rotation speed of the wiper motor is large, the controller controls the drive section such that the effective voltage for the current switch-on to the coil is raised in steps and the timing of the current switch-on is advanced in steps such that the rotation speed of the wiper motor attains the rotation speed indicated by the speed command. In a case in which a difference between a present rotation speed of the wiper motor and the third rotation speed indicated by the speed command is large, the controller controls the drive section such that the effective voltage for the current switch-on to the coil is lowered in steps and the timing of the current switch-on is retarded in steps such that the rotation speed of the wiper motor attains the rotation speed indicated by the speed command.

In this wiper device, in a case in which the difference in speed between a target rotation speed and the present rotation speed is large, the effective voltage for the current switch-on and the advance angle of the timing of the current switch-on are changed in steps, such that the rotation speed of the wiper motor is changed smoothly.

A wiper device of a sixth aspect of the present disclosure is the wiper device of the first aspect of the present disclosure, wherein in a case in which a rotation speed of the wiper motor is to be raised the controller controls the drive section so that high rotation control is performed by performing current switch-on in the coil at a timing advanced in electrical angle with respect to the timing corresponding to a rotation position of the rotor. In a case in which a torque of the wiper motor is to be raised the controller controls the drive section so that high torque rotation control is performed in which an equivalent torque is obtained at a lower current than in the high rotation control by performing current switch-on in the coil at a timing corresponding to a rotation position of the rotor.

In this wiper device, the electrical angle of current switch-on to the coil is advanced with reference to a timing corresponding to the rotation position of the rotor, enabling the control mode to be switched from the high torque rotation control to the high rotation control. In other words, the torque of the output shaft of the wiper motor is raised and the current flowing in the wiper motor decreases by performing high torque rotation control in which the drive section generates a voltage that changes at a later timing than a timing in the high rotation control, enabling the wiper motor to be prevented from becoming overloaded.

A wiper device of a seventh aspect of the present disclosure is the wiper device of the sixth aspect of the present disclosure, wherein a case in which the torque of the wiper motor is to be raised correspond to a case in which a wiping operation by the wiper blade has been obstructed.

In this wiper device, the high torque rotation control is performed to raise the torque of the output shaft in a case in which the wiping operation has been obstructed by an obstruction such as accumulated snow or the like, enabling the obstruction to be cleared and the wiping operation to resume.

A wiper device of an eighth aspect of the present disclosure is the wiper device of the seventh aspect of the present disclosure, further including a current detection section that detects a current value of the coil. The controller determines that the wiping operation by the wiper blade has been obstructed in a case in which the current value has exceeded a predetermined threshold value during the wiping operation by the wiper blade.

In this wiper device, the wiping operation is determined to have been obstructed in a case in which the coil current has become excessively large. The high torque rotation control is then performed, enabling the obstruction to be cleared and the wiping operation to resume.

A wiper device of a ninth aspect of the present disclosure is the wiper device of the seventh aspect of the present disclosure, further including a temperature detection section that detects a temperature of the drive section. The controller determines that the wiping operation by the wiper blade has been obstructed in a case in which the temperature has exceeded a predetermined threshold temperature during the wiping operation by the wiper blade.

In this wiper device, the wiping operation is determined to have been obstructed in a case in which the drive section is at a high temperature. The high torque rotation control is then performed, enabling the obstruction to be cleared and the wiping operation to resume.

A wiper device of a tenth aspect of the present disclosure is the wiper device of the seventh aspect of the present disclosure, further including a rotation angle detection section that detects a rotation angle of an output shaft of the wiper motor.

The controller determines that the wiping operation by the wiper blade has been obstructed in a case in which a rotation angle of the output shaft detected by the rotation angle detection section does not change during the wiping operation by the wiper blade.

In this wiper device, the wiping operation is determined to have been obstructed in a case in which a rotation angle of the output shaft does not change. The high torque rotation control is then performed, enabling the obstruction to be cleared and the wiping operation to resume.

BRIEF DESCRIPTION OF DRAWINGS

FIG. 11 is a flowchart illustrating an example of rotation control processing of a wiper motor of a wiper device according to the second exemplary embodiment of the present disclosure.

DESCRIPTION OF EMBODIMENTS

Explanation follows regarding a wiper device according to a first exemplary embodiment of the present disclosure, with reference to FIG. 1 to FIG. 7.

Figure 1:
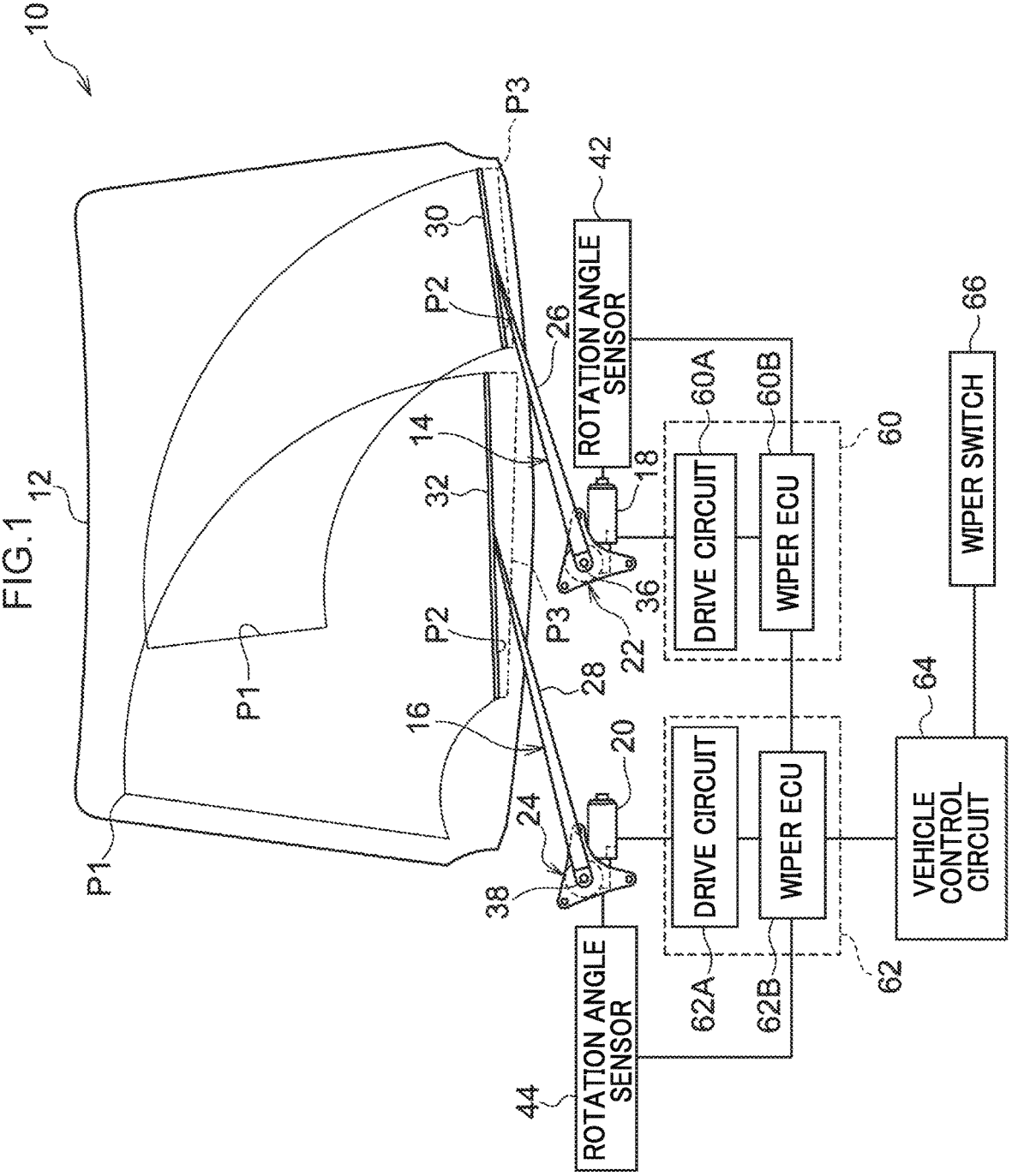
FIG. 1 is a schematic diagram illustrating configuration of a wiper device according to a first exemplary embodiment and a second exemplary embodiment of the present disclosure.

FIG. 1 is a schematic diagram illustrating configuration of a wiper device 10 according to the first exemplary embodiment of the present disclosure. As an example, the wiper device 10 is a direct-drive tandem wiper device including a left wiper device 14 on the left (front passenger seat side) of a lower portion of windshield glass 12 of a vehicle, and a right wiper device 16 on the right (driver's seat side) of the lower portion of the windshield glass 12 of the vehicle. Note that left and right in the first exemplary embodiment of the present disclosure correspond to the left and right as viewed from inside a vehicle cabin. In the wiper device 10 according to the first exemplary embodiment of the present disclosure, a wiper arm 26 of the left wiper device 14 and a wiper arm 28 of the right wiper device 16 are swung in the same direction as each other. Accordingly, an output shaft 36 of the left wiper device 14 and an output shaft 38 of the right wiper device 16 are rotated in the same direction as each other.

The left wiper device 14 and the right wiper device 16 respectively include wiper motors 18, 20, speed reduction mechanisms 22, 24, the wiper arms 26, 28, and wiper blades 30, 32. The wiper motors 18, 20 are respectively provided at the lower left and the lower right of the windshield glass 12.

In the left wiper device 14 and the right wiper device 16, the speed of forward rotation and reverse rotation of the wiper motors 18, 20 is reduced by the respective speed reduction mechanisms 22, 24. The output shafts 36, 38 are rotated forward and in reverse after speed reduction by the respective speed reduction mechanisms 22, 24. Moreover, rotation force to rotate the output shafts 36, 38 forward and in reverse acts on the respective wiper arms 26, 28 so as to move the wiper arms 26, 28 from a stowed position P3 to a lower return position P2, and so as to perform a to-and-fro wiping operation between the lower return position P2 and an upper return position P1. Due to this operation of the wiper arms 26, 28, the wiper blades 30, 32 provided to leading ends of the respective wiper arms 26, 28 wipe the surface of the windshield glass 12 between the lower return position P2 and the upper return position P1. Note that the speed reduction mechanisms 22, 24 are configured by worm gears for example, and the speed of rotation of the wiper motors 18, 20 is reduced to rotation speeds appropriate for wiping the surface of the windshield glass 12 with the wiper blades 30, 32, such that the output shafts 36, 38 are rotated at these rotation speeds.

As described above, the wiper motors 18, 20 according to the first exemplary embodiment of the present disclosure include the respective speed reduction mechanisms 22, 24 configured by worm gears. The rotation speeds and rotation angles of the output shafts 36, 38 are not the same as the rotation speeds and rotation angles of the wiper motors 18, 20. However, since the wiper motors 18, 20 and the speed reduction mechanisms 22, 24 are integral and inseparable in the first exemplary embodiment of the present disclosure, the rotation speeds and rotation angles of the output shafts 36, 38 are treated as if they were the rotation speeds and rotation angles of the wiper motors 18, 20. In the first exemplary embodiment of the present disclosure, for example, the rotation direction of the output shaft 36 of the left wiper device 14 is synchronized with the rotation direction of the output shaft 38 of the right wiper device 16, such that the output shaft 36 and the output shaft 38 are rotated in the same direction as each other.

Wiper control circuits 60, 62 for controlling rotation of the respective wiper motors 18, 20 are connected to the wiper motors 18, 20. In the first exemplary embodiment of the present disclosure, the wiper control circuit 60 includes a drive circuit 60A serving as a drive section and a wiper ECU 60B serving as a controller, and the wiper control circuit 62 includes a drive circuit 62A serving as a drive section and a wiper ECU 62B serving as a controller.

A rotation angle sensor 42 serving as a rotation angle detection section for detecting the rotation speed and rotation angle of the output shaft 36 of the wiper motor 18 is connected to the wiper ECU 60B. A rotation angle sensor 44 serving as a rotation angle detection section for detecting the rotation speed and rotation angle of the output shaft 38 of the wiper motor 20 is connected to the wiper ECU 62B. The wiper ECUs 60B, 62B compute the respective positions of the wiper blades 30, 32 on the windshield glass 12 based on signals from the rotation angle sensors 42, 44. The wiper ECUs 60B, 62B also control the respective drive circuits 60A, 62A so as to change the rotation speeds of the output shafts 36, 38 according to the computed positions. Note that the rotation angle sensors 42, 44 are provided inside the speed reduction mechanisms 22, 24 of the respective wiper motors 18, 20, and convert a magnetic field (magnetic force) of excitation coils or magnets, rotating interlocked to the output shafts 36, 38, into current for detection. Control of the rotation speeds of the output shafts 36, 38 is performed with reference to a speed map (not illustrated in the drawings), described later. The speed map is stored in memory or the like, and defines rotation speeds of the output shafts 36, 38 according to the positions of the wiper blades 30, 32.

The drive circuits 60A, 62A supply the respective wiper motors 18, 20 with voltages (currents) employed to actuate the wiper motors 18, 20 generated under pulse width modulation (PWM) control. The drive circuits 60A, 62A each include a circuit employing a field-effect transistor (MOSFET) as a switching element. The drive circuits 60A, 62A output voltages at a predetermined duty ratio, with the drive circuit 60A being under the control of the wiper ECU 60B and the drive circuit 62A being under the control of the wiper ECU 62B.

Operation of the left wiper device 14 and the right wiper device 16 is synchronized by a communication link between the wiper ECU 60B and the wiper ECU 62B using a local interconnect network (LIN) protocol or the like. A wiper switch 66 is connected to the wiper ECU 62B of the wiper control circuit 62 through a vehicle control circuit 64.

The wiper switch 66 is a switch for switching power supply from a vehicle battery to the wiper motors 18, 20 ON and OFF. The wiper switch 66 is capable of switching between a low speed operation mode selection position to operate the wiper blades 30, 32 at low speed, a high speed operation mode selection position to operate the wiper blades 30, 32 at high speed, an intermittent operation mode selection position to actuate the wiper blades 30, 32 intermittently at a fixed interval, and a stationary mode selection position. Command signals to rotate the wiper motors 18, 20 according to the respective mode selection positions are output to the wiper ECU 62B through the vehicle control circuit 64. The command signals input to the wiper ECU 62B are also input to the wiper ECU 60B by communication through the LIN protocol or the like mentioned above. For convenience, the right wiper device 16 in FIG. 1 is a master wiper, and the left wiper device 14 therein is a slave wiper.

When a signal output according to the corresponding mode selection position is input to the wiper ECUs 60B, 62B from the wiper switch 66, the wiper ECUs 60B, 62B perform control in response to the output signal from the wiper switch 66. Specifically, the wiper ECUs 60B, 62B compute rotation speeds for the output shafts 36, 38 based on the command signal from the wiper switch 66 and the speed map mentioned above. The wiper ECUs 60B, 62B then control the drive circuits 60A, 62A such that the output shafts 36, 38 rotate at the computed rotation speeds.

Figure 2:
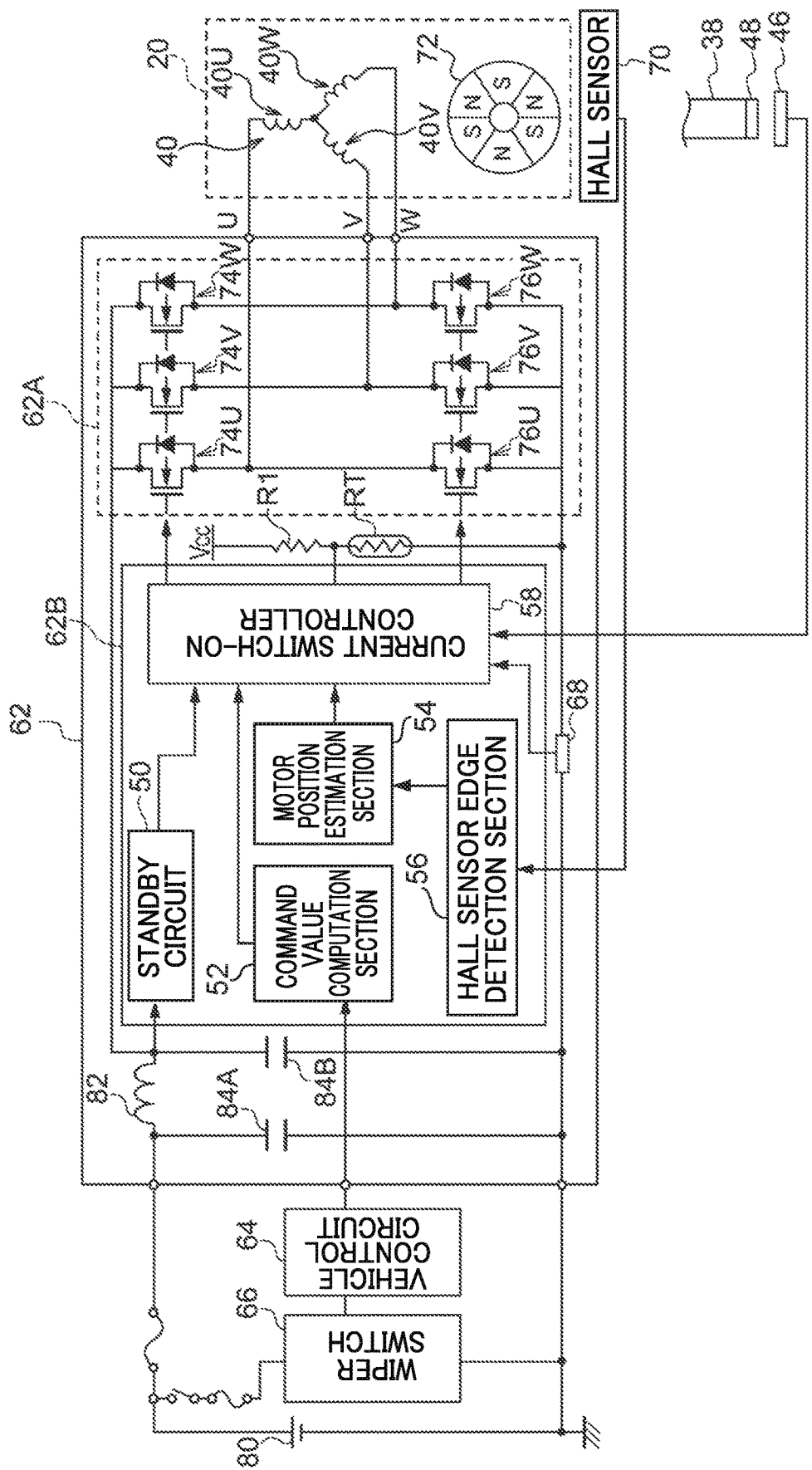
FIG. 2 is a schematic block diagram illustrating an example of configuration of a wiper control circuit of a right wiper device according to the first exemplary embodiment and the second exemplary embodiment of the present disclosure.

FIG. 2 is a block diagram schematically illustrating an example of a configuration of the wiper control circuit 62 of the right wiper device 16 according to the first exemplary embodiment of the present disclosure. Although the wiper motor 20 illustrated in FIG. 2 is a brushless DC motor as an example, the wiper motor 20 may be a brushed DC motor. Note that the configuration of the wiper control circuit 60 of the left wiper device 14 is similar to that of the wiper control circuit 62 of the right wiper device 16, and therefore detailed explanation thereof is omitted.

The wiper control circuit 62 illustrated in FIG. 2 includes the drive circuit 62A and the wiper ECU 62B. The drive circuit 62A generates a voltage to be applied to terminals of coils 40U, 40V, 40W of the stator in the wiper motor 20. The wiper ECU 62B controls ON and OFF switching of switching elements configuring the drive circuit 62A.

A rotor 72 of the wiper motor 20 includes three S poles and three N poles configured by permanent magnets, and is configured to rotate so as to follow a rotating magnetic field generated by stator coils. The magnetic field of the rotor 72 is detected by a Hall sensor 70. The Hall sensor 70 may detect a magnetic field of sensor magnets provided separately to the rotor 72 and having a polarity corresponding to that of the permanent magnets of the rotor 72. The Hall sensor 70 detects the magnetic field of the rotor 72 or of the sensor magnets as a magnetic field indicating the position of the rotor 72.

The Hall sensor 70 is a sensor that detects the magnetic field formed by the rotor 72 or by the sensor magnets in order to detect the position of the rotor 72. The Hall sensor 70 includes three Hall elements respectively corresponding to U, V, and W phases. The Hall sensor 70 outputs changes in the magnetic field generated by rotation of the rotor 72 as voltage change signals approximated to a sine wave.

The signals output by the Hall sensor 70 are input to the wiper ECU 62B, this being a control circuit. The wiper ECU 62B is an integrated circuit, and power supplied from a battery 80 serving as a power source is controlled by a standby circuit 50.

Analogue waveform signals input to the wiper ECU 62B from the Hall sensor 70 are input to a Hall sensor edge detection section 56 inside the wiper ECU 62B that includes a circuit such as a comparator to convert the analogue signals to digital signals. In the Hall sensor edge detection section 56, the input analogue waveform is converted into a digital waveform, and edge portions in the digital waveform are detected.

The digital waveform and edge information is input to a motor position estimation section 54 to compute the position of the rotor 72. Information regarding the computed position of the rotor 72 is input to a current switch-on controller 58.

A command value computation section 52 of the wiper ECU 62B is input with a signal from the wiper switch 66 to instruct the rotation speed of the wiper motor 20 (the rotor 72). The command value computation section 52 extracts a command relating to the rotation speed of the wiper motor 20 from the signal input from the wiper switch 66, and inputs the command to the current switch-on controller 58.

The current switch-on controller 58 computes a phase of voltage to be changed according to the positions of the magnetic poles of the rotor 72 as computed by the motor position estimation section 54, and decides on a drive duty value based on the computed phase and the rotation speed of the rotor 72 instructed by the wiper switch 66. The current switch-on controller 58 also performs PWM control to generate a PWM signal, this being a pulse signal according to the drive duty value, and to output the PWM signal to the drive circuit 62A. Under this PWM control, the drive circuit 62A generate a voltage that changes at timings based on the positions of the magnetic poles of the rotor 72, and applies this voltage to the coils 40U, 40V, 40W of a stator 40. The coils 40U, 40V, 40W applied with this voltage generate a rotating magnetic field that rotates the rotor 72.

The drive circuit 62A is configured by a three-phase (a U phase, a V phase, and a W phase) inverter. As illustrated in FIG. 2, the drive circuit 62A includes three N-channel field-effect transistors (MOSFETs) 74U, 74V, 74W (referred to hereafter as FETs 74U, 74V, 74W) serving as upper tier switching elements, and three N-channel field-effect transistors 76U, 76V, 76W (referred to hereafter as FETs 76U, 76V, 76W) serving as lower tier switching elements. Note that the FETs 74U, 74V, 74W and the FETs 76U, 76V, 76W are referred to collectively as the FETs 74 and the FETs 76 when there is no need to distinguish between them individually, and are suffixed with U, V, or W when there is a need to distinguish between them individually.

Within the FETs 74 and the FETs 76, the source of the FET 74U and the drain of the FET 76U are connected to a terminal of the coil 40U, the source of the FET 74V and the drain of the FET 76V are connected to a terminal of the coil 40V, and the source of the FET 74W and the drain of the FET 76W are connected to a terminal of the coil 40W.

The gates of the FETs 74 and the FETs 76 are connected to the current switch-on controller 58, and are input with PWM signals. When H level PWM signals are input to the gates of the FETs 74 and the FETs 76, the FETs 74 and the FETs 76 are switched to an ON state, and current flows from the drains to the sources. When L level PWM signals are input to the gates of the FETs 74 and the FETs 76, the FETs 74 and the FETs 76 are switched to an OFF state, resulting in a state in which current does not flow from the drains to the sources.

The wiper control circuit 62 of the first exemplary embodiment of the present disclosure is configured by the battery 80, a noise prevention coil 82, smoothing capacitors 84A, 84B, and the like. The battery 80, the noise prevention coil 82, and the smoothing capacitors 84A, 84B configure a substantially direct current power source.

A chip thermistor RT serving as a temperature detection section is mounted on a substrate of the wiper control circuit 62 of the first exemplary embodiment of the present disclosure. One terminal of the chip thermistor RT is applied with a control voltage Vcc through a resistor R1 and another terminal of the chip thermistor RT is connected to ground. The chip thermistor RT detects the temperature of the substrate as a resistance value. The chip thermistor RT employed in the first exemplary embodiment of the present disclosure is a negative temperature coefficient (NTC) thermistor in which resistance decreases with respect to increasing temperature, such that a resistance value of the chip thermistor RT decreases as the temperature rises. Note that the chip thermistor RT may be employed in combination with an inverter circuit so as to be employed as a positive temperature coefficient (PTC) thermistor in which the resistance value increases as the temperature rises.

The chip thermistor RT and the resistor R1 configure a type of voltage divider circuit. One terminal of the chip thermistor RT that is connected to the resistor R1 outputs a voltage that changes based on the resistance value of the chip thermistor RT. The voltage output from the one terminal of the chip thermistor RT is compared against an overheating determination value by the current switch-on controller 58, and the wiper control circuit 62 is determined to be in an overheated state when the voltage output from the one terminal of the chip thermistor RT is the overheating determination value or lower. As described above, the chip thermistor RT according to the first exemplary embodiment of the present disclosure is a type in which the resistance decreases as the temperature rises, such that the voltage output from the one terminal of the chip thermistor RT, this also being an output terminal of the voltage divider circuit configured by the resistor R1 and the chip thermistor RT, decreases with rising temperature. The current switch-on controller 58 determines that the circuit is overheating when the voltage output from the one terminal of the chip thermistor RT is the overheating determination value or lower. The overheating determination value varies according to the positions of the elements mounted on the substrate, the position of the chip thermistor RT, and the like, but is, for example, a voltage output by the voltage divider circuit configured by the chip thermistor RT and the resistor R1 at a temperature of 145° C.

A current detection section 68 serving as a current detection section is provided between the respective sources of the FETs 76U, 76V, 76W and the battery 80. The current detection section 68 includes a shunt resistor with a resistance value in the region of 0.2 mΩ to several Ω, and includes an amp that amplifies a potential difference between the two terminals of the shunt resistor and outputs a signal with a voltage value proportional to the current in the shunt resistor. The signal output from the amp is input to the current switch-on controller 58. The current switch-on controller 58 compares the signal output from the current detection section 68 against an overcurrent determination value, and determines the motor current to be overcurrent in a case in which the signal output by the current detection section 68 is the overcurrent determination value or greater. Note that although not illustrated in FIG. 2, voltage sensors to detect the voltage of the battery 80 and the like are mounted on substrates of the wiper control circuits 60, 62.

Figure 3:
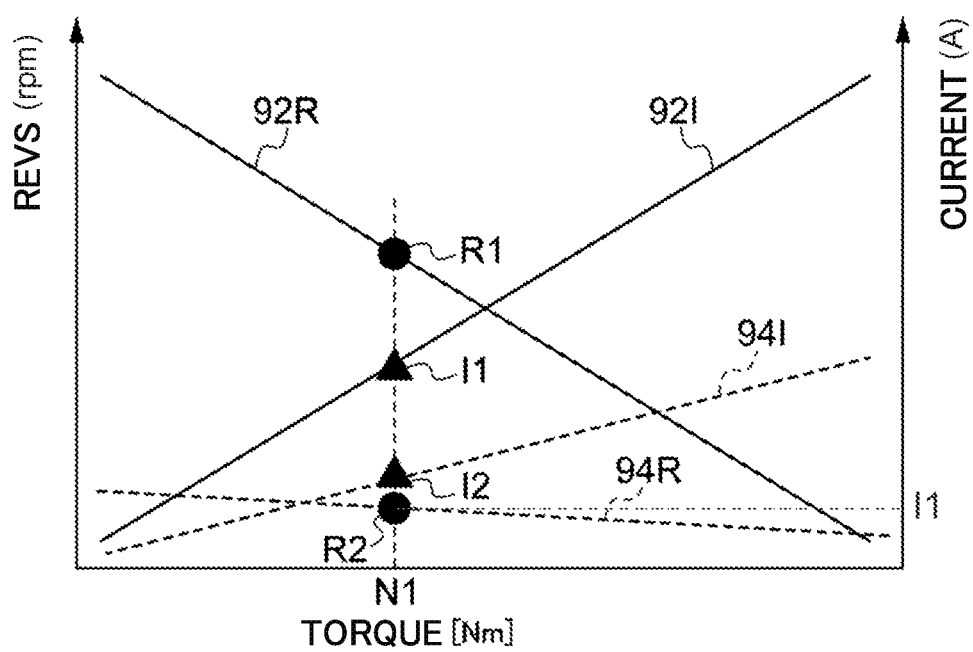
FIG. 3 is an explanatory diagram illustrating change in revs (rotation speed) of an output shaft and motor current with respect to torque of the output shaft in a wiper motor of a wiper device of the first exemplary embodiment of the present disclosure.

Explanation follows regarding operation and advantageous effects of the wiper device 10 according to the first exemplary embodiment of the present disclosure. FIG. 3 is an explanatory diagram illustrating how the revs (rotation speed) of the output shafts 36, 38 and the motor current change with respect to torque of the output shafts 36, 38 of the wiper motors 18, 20 of the wiper device 10 of the first exemplary embodiment of the present disclosure. The straight line 92R in FIG. 3 illustrates a relationship between the torque of the output shafts 36, 38 and the revs of the output shafts 36, 38 under high rotation control performed when the revs of the output shafts 36, 38 is a high speed. The straight line 92I in FIG. 3 illustrates a relationship between the torque of the output shafts 36, 38 and the motor current under high rotation control. As illustrated in FIG. 3, although the revs decreases when the torque of the output shafts 36, 38 is increased, the motor current becomes larger.

FIG. 3 indicates that when the output shafts 36, 38 are rotated at a torque N1 under high rotation control, the revs is R1 and the motor current is I1. When the output shafts 36, 38 are rotated at a higher torque than the torque N1, the revs becomes lower than R1, and the motor current becomes larger than I1. Accordingly, when the torque of the output shafts 36, 38 are increased under high rotation control, the motor current increases even though the revs decreases, causing the wiper motors 18, 20 to become overloaded.

Thus in the first exemplary embodiment of the present disclosure, low rotation control is performed in a case in which, for example, the torque of the output shafts 36, 38 becomes N1 or higher, so as to increase the torque of the output shafts 36, 38 while suppressing the motor current.

The straight line 94R in FIG. 3 illustrates a relationship between the torque of the output shafts 36, 38 and the revs of the output shafts 36, 38 under low rotation control in which the revs of the output shafts 36, 38 is lowered and the torque is increased. The straight line 94I illustrates a relationship between the torque of the output shafts 36, 38 and the motor current under low rotation control. Although the revs during low rotation control is lower than the revs during high rotation control, as illustrated by the straight line 94R, the motor current during low rotation control is lower than the motor current during high rotation control, as illustrated by the straight line 94I. As a result, the motor current when the output shafts 36, 38 are rotated at the torque N1 under low rotation control is I2, with this being lower than the motor current I1 when the output shafts 36, 38 are rotated at the torque N1 under high rotation control. Moreover, even when the torque of the output shafts 36, 38 is N1 or higher under low rotation control, the increase in motor current is not as steep as that of the motor current of high rotation control, making the wiper motors 18, 20 less liable to become overloaded. Moreover, even when the torque of the output shafts 36, 38 is increased under low rotation control, the decrease in the revs of the output shafts 36, 38 is not as steep as that of high rotation control. Low rotation control is accordingly more practical than high rotation control in a case in which the output shafts 36, 38 are being rotated at a high torque.

Figure 4A:
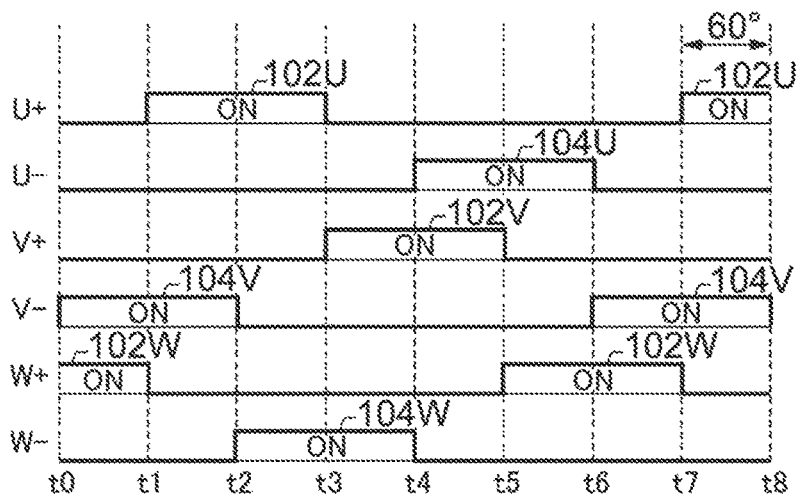
FIG. 4A is a timing chart illustrating an example of a pattern of current switch-on to coils under intermediate rotation control performed in a case in which the revs of an output shaft of a wiper motor of a wiper device of the first exemplary embodiment of the present disclosure is an intermediate speed.

FIG. 4A is a timing chart illustrating an example of a pattern of current switch-on to the coils 40U, 40V, 40W under intermediate rotation control, performed in a case in which the revs of the output shafts 36, 38 is an intermediate speed. Current switch-ons 102U, 102V, 102W and current switch-ons 104U, 104V, 104W illustrated with square forms in FIG. 4A represent timings at which current switch-on is performed to the coils 40U, 40V, 40W. Although the current switch-ons 102U, 102V, 102W and the current switch-ons 104U, 104V, 104W are illustrated to have square forms in FIG. 4A to FIG. 4C for convenience, at actual current switch-on, a voltage modulated in a pulse pattern using PWM is applied to the coils 40U, 40V, 40W. Note that unit time in FIG. 4A to FIG. 4C (for example the period from a time t0 to a time t1) is the time taken for the rotor 72 to rotate through an electrical angle of 60°. The timings of current switch-on in FIG. 4A are timings corresponding to the positions of the magnetic poles of the rotor 72 as detected by the Hall sensor 70.

The FET 74W and the FET 76V are ON from the time t0 to the time t1, and current from the coil 40W to the coil 40V is switched-on. The FET 74U and the FET 76V are ON from the time t1 to the time t2, and current from the coil 40U to the coil 40V is switched-on. The FET 74U and the FET 76W are ON from the time t2 to the time t3, and current from the coil 40U to the coil 40W is switched-on. The FET 74V and the FET 76W are ON from the time t3 to the time t4, and current from the coil 40V to the coil 40W is switched-on. The FET 74V and the FET 76U are ON from the time t4 to the time t5, and current from the coil 40V to the coil 40U is switched-on. The FET 74W and the FET 76U are ON from the time t5 to the time t6, and current from the coil 40W to the coil 40U is switched-on. The FET 74W and the FET 76V are ON from the time t6 to the time t7, and current from the coil 40W to the coil 40V is switched-on. The FET 74U and the FET 76V are ON from the time t7 to the time t8, and current from the coil 40U to the coil 40V is switched-on.

Figure 4B:
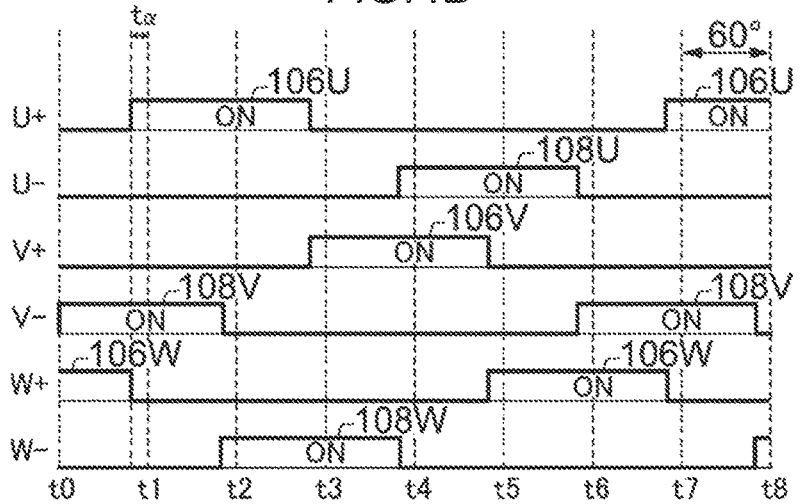
FIG. 4B is a timing chart illustrating an example of a pattern of current switch-on to coils under high rotation control of an output shaft of a wiper motor of a wiper device of the first exemplary embodiment of the present disclosure.

FIG. 4B is a timing chart illustrating an example of a pattern of current switch-on to the coils 40U, 40V, 40W under high rotation control. In FIG. 4B, current switch-ons 106U, 106V, 106W, 108U, 108V, 108W are performed at timings that are each earlier by tα than (advanced with respect to) the current switch-on timings of the current switch-ons 102U, 102V, 102W, 104U, 104V, 104W in FIG. 4A. Since tα differs according to the wiper motor specifications and the like, the tα is specifically decided through simulations at the design stage, or by testing using actual devices. Configuration may be made such that the tα is not fixed, and tα becomes larger the greater the revs of the output shafts 36, 38.

Although the current switch-ons 106U, 106V, 106W, 108U, 108V, 108W are illustrated to have square forms for convenience, at actual current switch-on, a voltage modulated in a pulse pattern using PWM is applied to the coils 40U, 40V, 40W. Since it is necessary to raise the effective voltage values of the voltages applied to the coils 40U, 40V, 40W in order to rotate the output shafts 36, 38 at high speed, the duty ratios of the current switch-ons 106U, 106V, 106W, 108U, 108V, 108W are greater than the duty ratios of the current switch-ons 102U, 102V, 102W, 104U, 104V, 104W in FIG. 4A.

Figure 4C:
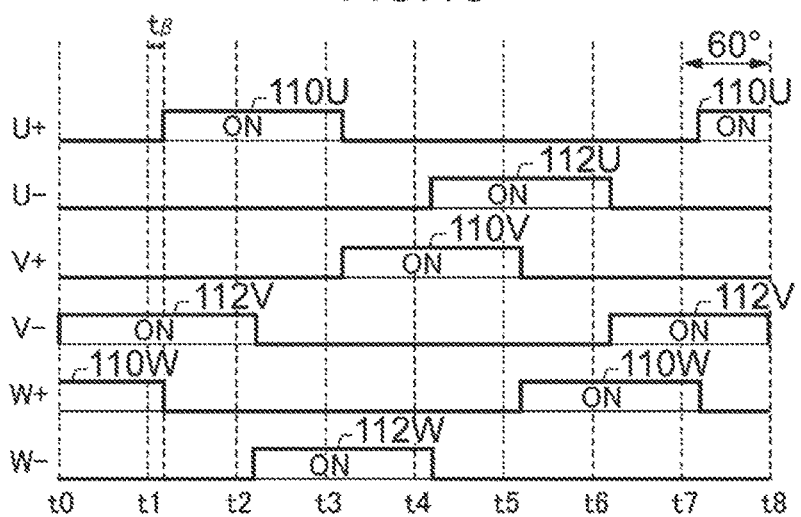
FIG. 4C is a timing chart illustrating an example of a pattern of current switch-on to coils under low rotation control of an output shaft of a wiper motor of a wiper device of the first exemplary embodiment of the present disclosure.

FIG. 4C is a timing chart illustrating an example of a pattern of current switch-on to the coils 40U, 40V, 40W under low rotation control. In FIG. 4C, current switch-ons 110U, 110V, 110W, 112U, 112V, 112W are performed at timings that are each delayed (retarded) by tβ with respect to the current switch-on timings of the current switch-ons 102U, 102V, 102W, 104U, 104V, 104W in FIG. 4A. Since 43 differs according to the wiper motor specifications and the like, the tβ is specifically decided through simulations at the design stage, or by testing using actual devices. Configuration may be made in which tβ is not fixed, and tβ becomes larger the lower the revs of the output shafts 36, 38.

Although the current switch-ons 110U, 110V, 110W, 112U, 112V, 112W are illustrated to have square forms for convenience, at actual current switch-on, a voltage modulated in a pulse pattern using PWM is applied to the coils 40U, 40V, 40W. Since it is necessary to lower the effective voltage values of the voltages applied to the coils 40U, 40V, 40W in order to rotate the output shafts 36, 38 at low speed, the duty ratios of the current switch-ons 110U, 110V, 110W, 112U, 112V, 112W are smaller than the duty ratios of the current switch-ons 102U, 102V, 102W, 104U, 104V, 104W in FIG. 4A.

Effective ways to accommodate high speed rotation with brushless DC motors generally include increasing the duty ratio of the voltage applied to the respective U, V, W phases to raise the effective voltage, as well as advancing the electrical angle of current switch-on timings to the respective phases with respect to timings corresponding to the positions of the magnetic poles of the rotor 72 detected by the Hall sensor 70. Effective ways to accommodate low rotation speeds as well as to raise the output shaft torque and suppress motor current include reducing the duty ratio of the voltage applied to the respective U, V, W phases to lower the effective voltage, and retarding the electrical angle of current switch-on timings to the respective U, V, W phases with respect to timings corresponding to the positions of the magnetic poles of the rotor 72 detected by the Hall sensor 70. In the first exemplary embodiment of the present disclosure, the current switch-on timings are advanced as illustrated in FIG. 4B when the output shafts 36, 38 of the wiper motors 18, 20 are to be rotated at high speed. Moreover, in the first exemplary embodiment of the present disclosure, the current switch-on timings are retarded as illustrated in FIG. 4C when the output shafts 36, 38 of the wiper motors 18, 20 are to be rotated at low speed when suppressing the motor current while securing torque of the output shafts.

In the case illustrated in FIG. 4C, although the torque of the output shafts 36, 38 of the wiper motors 18, 20 would rise further if tβ was larger, this would tend to increase the motor current. Further increasing tβ from this state might cause the wiper motors 18, 20 to cease to maintain rotation of the output shafts 36, 38 and step out to occur.

Figure 5A:
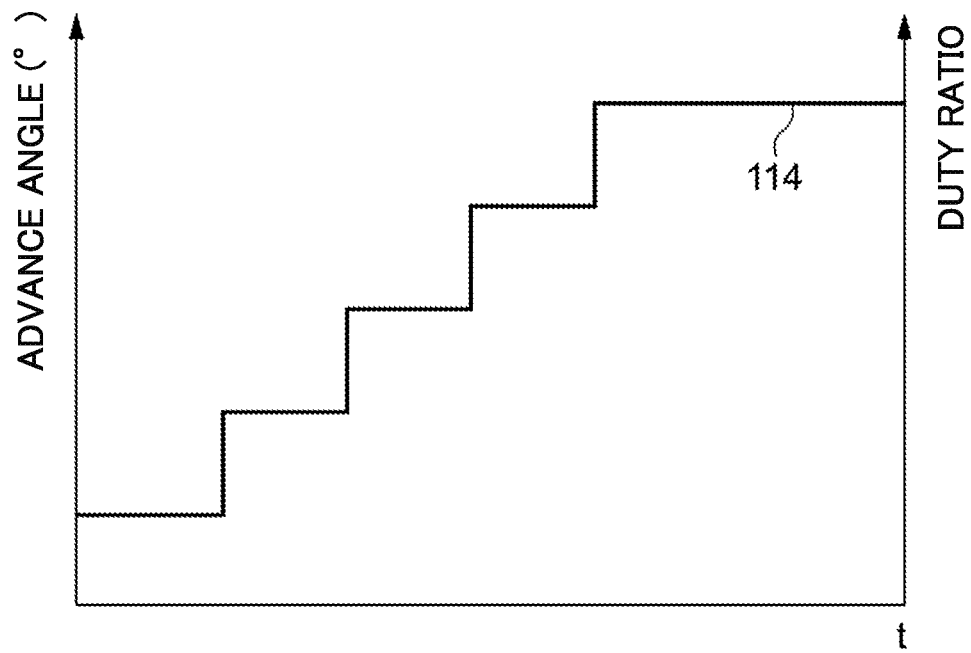
FIG. 5A is a timing chart illustrating an example of a time series of changes in advance angles and duty ratio of a voltage applied to coils in a case in which the revs of an output shaft of a wiper motor of a wiper device of the first exemplary embodiment of the present disclosure is changed from a low speed to a high speed.
Figure 5B:
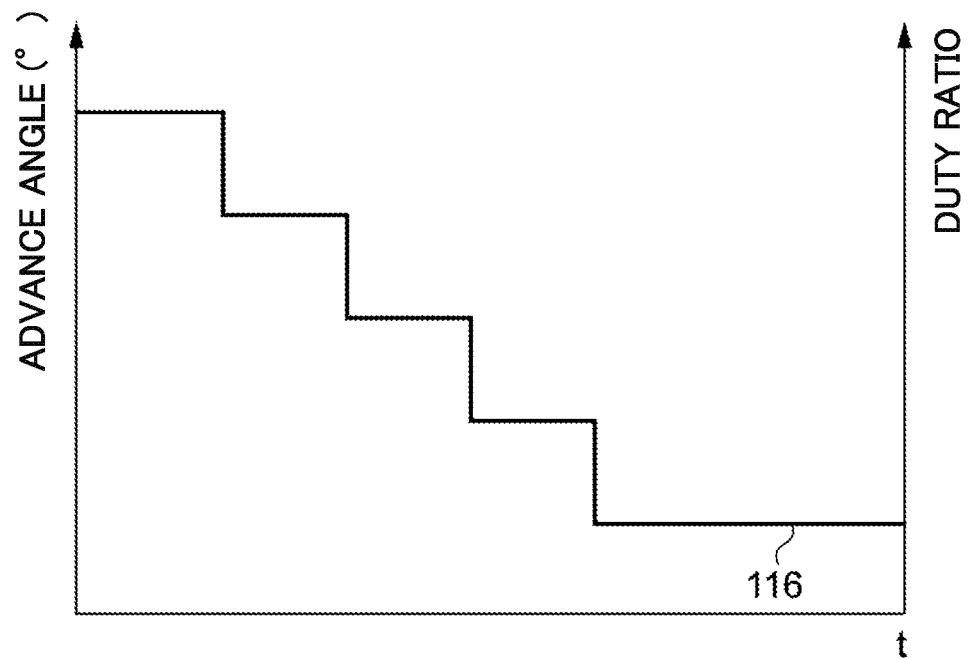
FIG. 5B is a timing chart illustrating an example of a time series of changes in advance angles and duty ratio of a voltage applied to coils in a case in which the revs of an output shaft of a wiper motor of a wiper device of the first exemplary embodiment of the present disclosure is changed from a high speed to a low speed.

FIG. 5A is a timing chart illustrating an example a time series for changes in the advance angles (tα, tβ) and the duty ratio of voltages applied to the coils 40U, 40V, 40W adopted when changing the revs of the output shafts 36, 38 from a low speed to a high speed. FIG. 5B is a timing chart illustrating an example a time series for changes in the advance angles (tα, tβ) and the duty ratio of the voltage applied to the coils 40U, 40V, 40W when changing the revs of the output shafts 36, 38 from a high speed to a low speed.

For example, FIG. 5A illustrates a case in which the wiper switch 66 has been switched from a low speed operation mode select position to a high speed operation mode select position. In a case in which there is a large difference between a target rotation speed in the high speed operation mode and the present rotation speed of the output shafts 36, 38, if the advance angle and the duty ratio are increased sharply such that the rotation speed of the output shafts 36, 38 accelerates sharply, the rotation of the output shafts 36, 38 might be perturbed. Accordingly, in the first exemplary embodiment of the present disclosure, as illustrated by the polygonal line 114 in FIG. 5A, the rotation of the output shafts 36, 38 is accelerated in steps by increasing the advance angle and the duty ratio in steps. Note that in a case in which the difference between the target rotation speed in the high speed operation mode and the present rotation speed of the output shafts 36, 38 is large, sometimes the difference may be larger than a rotation speed difference that can be accommodated by increasing the advance angle and the duty ratio in a single jump. The change amounts of the advance angle and the duty ratio in a single step are decided through calculations or testing on actual devices based on the specifications of the wiper motors 18, 20 and the wiper device 10 and the like, so as to be within a range that does not result in hunting for the rotation of the output shafts 36, 38 of the wiper motors 18, 20.

For example, FIG. 5B illustrates a case in which the wiper switch 66 has been switched from the high speed operation mode select position to the low speed operation mode select position. In a case in which there is a large difference between the present rotation speed of the output shafts 36, 38 and a target rotation speed in the low speed operation mode, if the advance angle and the duty ratio are decreased sharply such that the rotation speed of the output shafts 36, 38 sharply decreases, the rotation of the output shafts 36, 38 might be perturbed. Accordingly, in the first exemplary embodiment of the present disclosure, as illustrated by the polygonal line 116 in FIG. 5B, the rotation of the output shafts 36, 38 is decelerated in steps by lowering the advance angle and the duty ratio in steps. Note that in a case in which the difference between the present rotation speed of the output shafts 36, 38 and the target rotation speed in the low speed operation mode is large, sometimes the difference may be larger than a rotation speed difference that can be accommodated by reducing the advance angle and the duty ratio in a single jump. The change amounts of the advance angle and the duty ratio in a single step are decided through calculations or testing on actual devices based on the specifications of the wiper motors 18, 20 and the wiper device 10 and the like, so as to be within a range that does not result in hunting for the rotation of the output shafts 36, 38 of the wiper motors 18, 20.

In the first exemplary embodiment of the present disclosure, the larger the difference between the revs before and after changing, the greater the number of steps over which the advance angle and the duty ratio are changed. For example, in a case in which rotation under low rotation control is switched to rotation under high rotation control, a change needs to be made from tβ (lag) corresponding to the smallest angle of advance to tα corresponding to the largest angle of advance. Moreover, since the change amount in the duty ratio is also large, the advance angle and the duty ratio are changed are increased over several steps. Similarly, in a case in which rotation under high rotation control is switched to rotation under low rotation control, the advance angle and the duty ratio are reduced over several steps.

Figure 6:
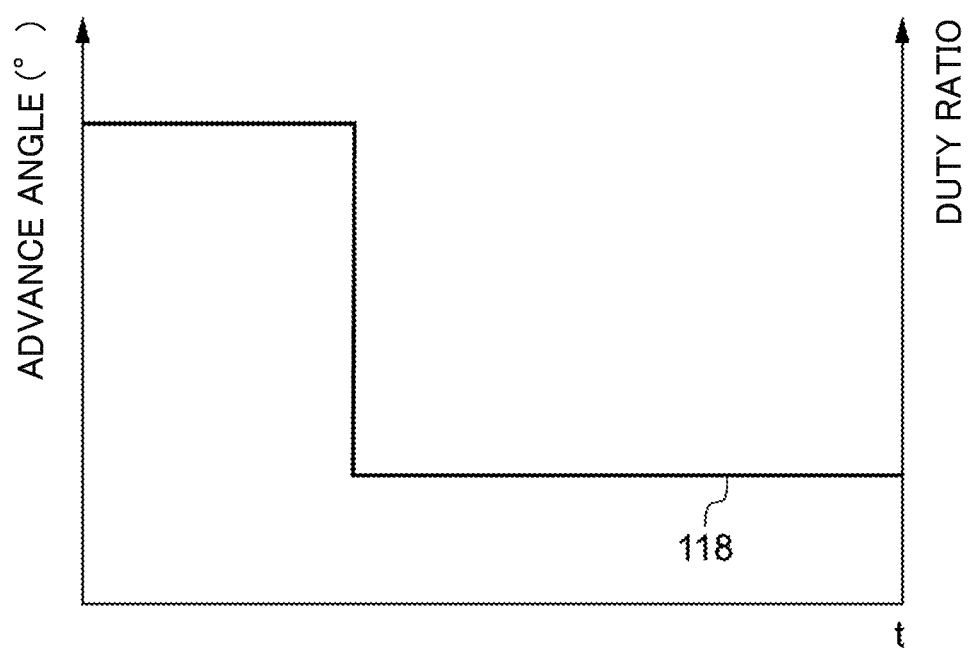
FIG. 6 is a timing chart illustrating an example of a time series of changes in advance angles and duty ratio of a voltage applied to coils in a case in which a wiper motor has become overloaded in a wiper device according to the first exemplary embodiment of the present disclosure.

FIG. 6 is a timing chart illustrating an example of a time series of changes in the advance angles (tα, tβ) and the duty ratio of voltages applied to the coils 40U, 40V, 40W in a case in which the wiper motors 18, 20 have become overloaded in the wiper device 10 according to the first exemplary embodiment of the present disclosure. There is a risk of damaging the wiper motors 18, 20 and the drive circuits 60A, 62A if the present situation for current switch-on continues unchanged when the wiper motors 18, 20 have become overloaded. In the first exemplary embodiment of the present disclosure, as illustrated by the polygonal line 118 in FIG. 6, the advance angle of the current switch-on timings and the duty ratio of the voltages applied to the coils 40U, 40V, 40W are for example decreased sharply to an advance angle and duty ratio corresponding to low rotation control, such that the rotation speed of the output shafts 36, 38 decreases sharply. Although there may be a temporary perturbation to the rotation of the output shafts 36, 38 when the rotation of the output shafts 36, 38 are decreases sharply, damage to the wiper motors 18, 20 and the drive circuits 60A, 62A is prevented in the first exemplary embodiment of the present disclosure. Slowing the rotation speed of the output shafts 36, 38 is therefore prioritized.

In the first exemplary embodiment of the present disclosure, the wiper motors 18, 20 are determined to have become overloaded both in a case in which the motor current of either of the wiper motors 18, 20 has reached a upper limit value or greater, and in a case in which the temperature of the substrate of either of the wiper control circuits 60, 62 has reached a predetermined value (for example 145° C.) or higher. The advance angle and the duty ratio are accordingly changed as illustrated in FIG. 6.

Figure 7:
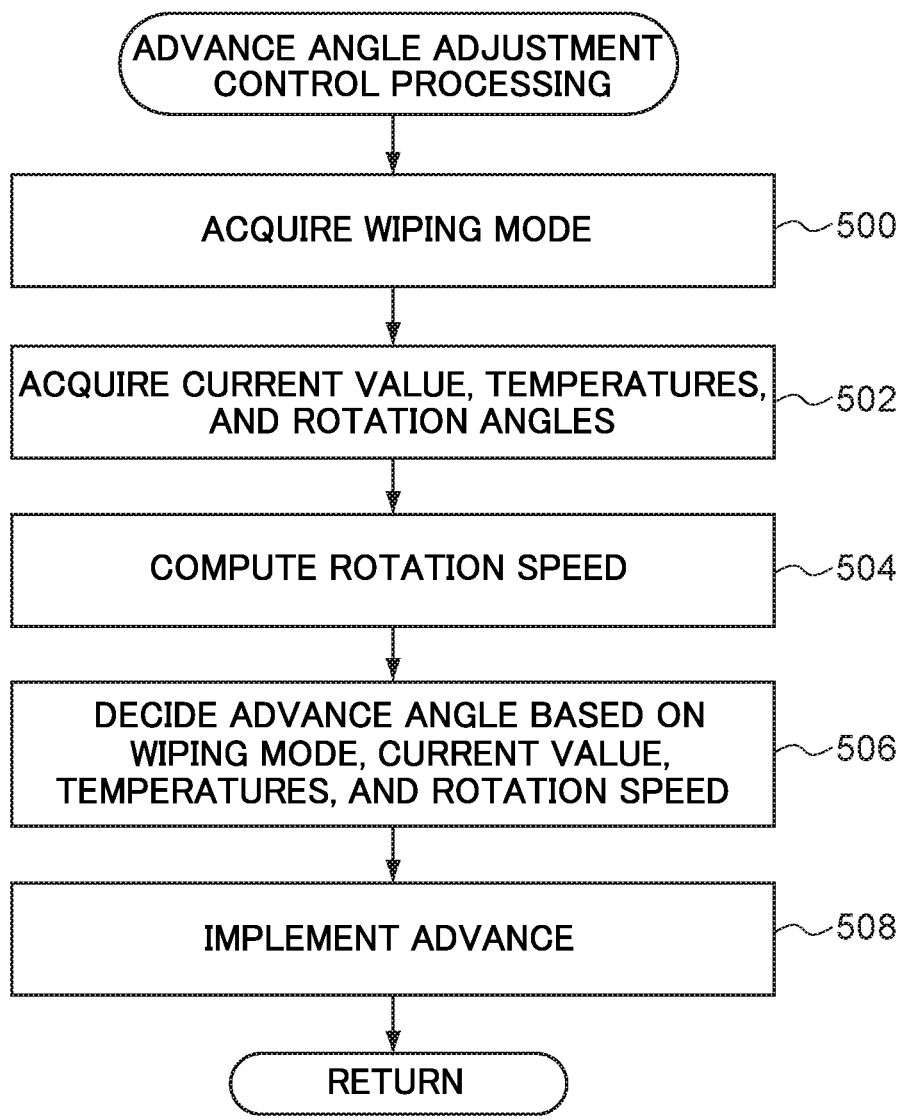
FIG. 7 is a flowchart illustrating an example of advance angle adjustment control processing in a wiper device according to the first exemplary embodiment of the present disclosure.
Figure 8:
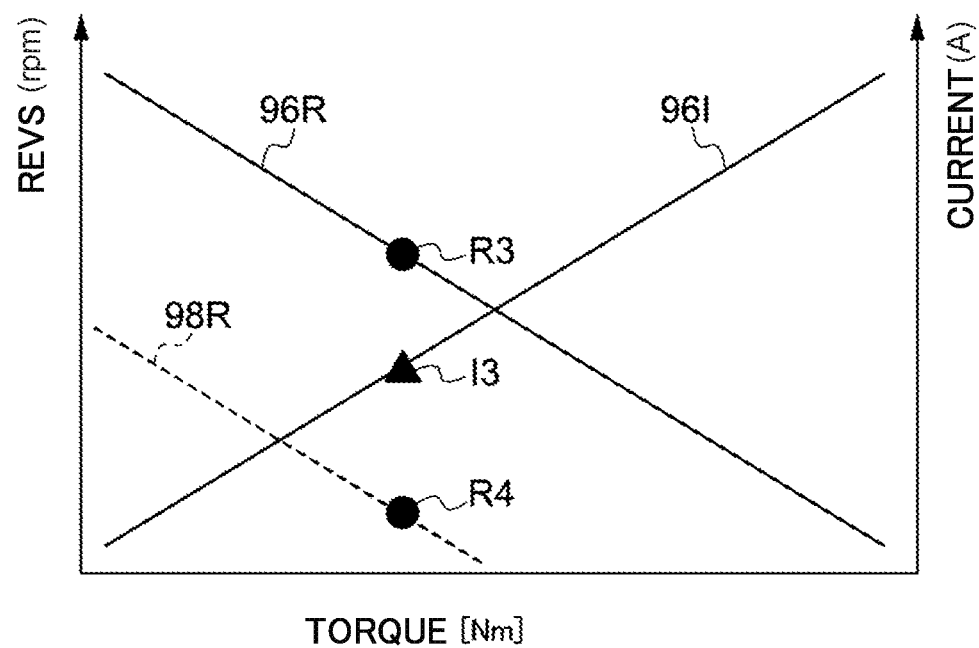
FIG. 8 is an explanatory diagram illustrating change in output shaft revs (rotation speed) and motor current with respect to torque of an output shaft of a generic brushless DC motor.

FIG. 7 is a flowchart illustrating an example of advance angle adjustment control processing in the wiper device 10 according to the first exemplary embodiment of the present disclosure. At step 500, wiping mode information, such as whether the wiper switch 66 is in the low speed operation mode or the high speed operation mode, is acquired.

At step 502, the current value of the motor current is acquired by the current detection section 68, the substrate temperatures are acquired by the chip thermistor RT, and the rotation angles of the output shafts 36, 38 of the wiper motors 18, 20 are acquired by the rotation angle sensors 42, 44. At step 504, the revs (rotation speed) of the output shafts 36, 38 is computed based on the rotation angles of the output shafts 36, 38 acquired at step 502.

At step 506, an advance angle is decided based on the wiping mode, the current value of the motor current, the substrate temperatures, and the rotation speeds of the output shafts 36, 38. For example, in a case in which the wiping mode is the high speed operation mode, the advance angle with respect to timings corresponding to the positions of the magnetic poles of the rotor 72 is increased, and in a case in which the wiping mode is the low speed operation mode, the advance angle is decreased, or current switch-on is performed at timings corresponding to the positions of the magnetic poles of the rotor 72 without any advance. In the low speed operation mode, low rotation control may be performed to retard by electrical angle the timings corresponding to the positions of the magnetic poles of the rotor 72. The advance angle is increased in a case in which the motor current of the wiper motors 18, 20 is low, and the temperatures of the substrates of the wiper control circuits 60, 62 are also low. However, the advance angle is reduced in a case in which the motor current is large or a case in which the temperature is high, even if the wiping mode is the high speed operation mode. In a case in which the motor current of either of the wiper motors 18, 20 is at the upper limit value or greater, or in a case in which the temperature of the substrate of either of the wiper control circuits 60, 62 is the predetermined value (for example 145° C.) or higher, low rotation control is performed such that the current switch-on timings are retarded even if the wiping mode is the high speed operation mode. Moreover, at step 506, the number of steps over which to change the advance angle is decided based on the rotation speed of the output shafts 36, 38 computed at step 504, and the difference in speed to the rotation speed in the wiping mode acquired at step 500. This is performed in order to change the advance angle over several steps in a case in which the speed difference is large, as illustrated in FIG. 5. Note that the advance angle is decreased sharply as illustrated in FIG. 6 in a case in which the motor current is the upper limit value or greater, and also in a case in which the substrate temperature is the predetermined value or higher.

At step 508, the current switch-on timings are advanced by the advance angle decided at step 506. In the first exemplary embodiment of the present disclosure, the duty ratio of the voltages applied to the coils 40U, 40V, 40W is also changed together with advancing the current switch-on timings. The processing returns after implementing the advance at step 508.

As described above, in the first exemplary embodiment of the present disclosure, the timings at which current switch-on is performed through the coils of the wiper motors 18, 20 are varied between a case in which the output shafts 36, 38 have a high rotation speed and a case in which the output shafts 36, 38 have a low rotation speed. For example, in a case in which the output shafts 36, 38 have a high rotation speed, the timings of current switch-on in the coils of the wiper motors 18, 20 are brought forward such that current switch-on is performed in a manner appropriate to high speed rotation. In a case in which the wiping operation by the wiper blades 30, 32 is slow, current switch-on is performed through the coils at later timings than the current switch-on timings during high speed rotation, enabling the current switch-on to be performed in a manner appropriate to low speed rotation and enabling the torque of the output shafts 36, 38 to be raised. When current switch-on is performed in a manner appropriate to low speed rotation, the motor current is suppressed in comparison to that during high speed rotation as illustrated in FIG. 3. This enables the wiper motors 18, 20 to be prevented from becoming overloaded.

Note that in the first exemplary embodiment of the present disclosure, although explanation has been given regarding an example of a direct-drive tandem wiper device including the wiper motor 18 of the left wiper device 14 and the wiper motor 20 of the right wiper device 16, the low rotation control and the high rotation control described above may also be applied to a wiper device in which the motive force of a single wiper motor is transmitted to left and right wipers through a link mechanism.

Next, explanation follows regarding a wiper device according to a second exemplary embodiment of the present disclosure, with reference to FIG. 9 to FIG. 12. Note that the wiper device according to the second exemplary embodiment of the present disclosure is similar to the wiper device of the first exemplary embodiment of the present disclosure, and so explanation regarding common locations is omitted. Moreover, locations of the wiper device according to the second exemplary embodiment of the present disclosure that require explanation and have the same configuration as the wiper device according to the first exemplary embodiment of the present disclosure are described using the same reference numerals.

Figure 9:
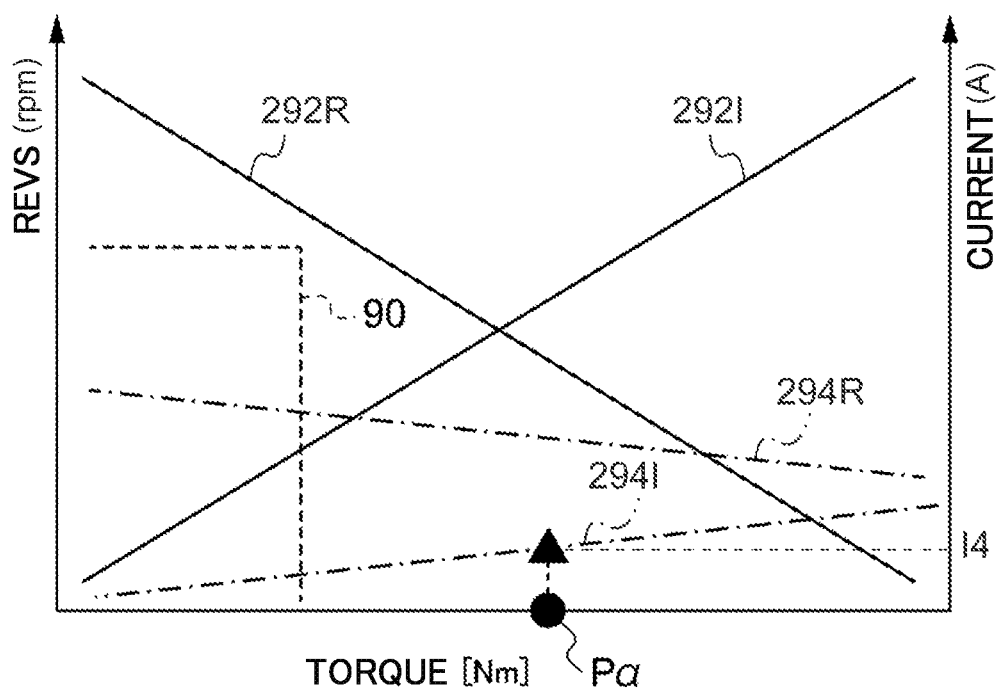
FIG. 9 is an explanatory diagram illustrating change in output shaft revs (rotation speed) and motor current with respect to torque of an output shaft of a wiper motor of a wiper device according to the second exemplary embodiment of the present disclosure.

FIG. 9 is an explanatory diagram illustrating changes in the revs (rotation speed) of output shafts 36, 38 of wiper motors 18, 20 and changes in motor current with respect to torque of the output shafts 36, 38 in the wiper device of the second exemplary embodiment of the present disclosure. As illustrated by the straight line 292R illustrating the relationship between torque of the output shafts 36, 38 and revs of the output shafts 36, 38 in FIG. 9, the revs of the output shafts 36, 38 decreases as the torque of the output shafts 36, 38 increases. Moreover, as illustrated by the straight line 292I illustrating the relationship between torque of the output shafts 36, 38 and motor current in FIG. 9, heat generation and power consumption of the wiper motors increase as the torque increases.

Situations in which increased torque is required of the output shafts 36, 38 include, for example, a case in which accumulated snow obstructs a wiping operation by the wiper blades 30, 32. However, when the torque of the output shafts 36, 38 is increased, the wiper motors 18, 20 become overloaded and the motor current increases.

There is a possibility at the snow-clearing operation point Pa illustrated in FIG. 9, corresponding to the torque required when clearing snow, that the motor current might exceed permissible current values within a normal wiping operation range 90. In such a case, rotation control is performed in the present exemplary embodiment to increase the torque of the output shafts 36, 38 while suppressing the motor current.

The straight line 294R in FIG. 9 illustrates a relationship between the torque of the output shafts 36, 38 and the revs of the output shafts 36, 38 during high torque rotation control to increase the torque of the output shafts 36, 38. The straight line 294I in FIG. 9 illustrates a relationship between the torque of the output shafts 36, 38 and the motor current during high torque rotation control. Although the revs during high torque rotation control is lower than the revs under high rotation control, as illustrated by the straight line 294R, the motor current is lower than the motor current under high rotation control, as illustrated by the straight line 294I. Accordingly, a snow-clearing motor current I4 at the snow-clearing operation point Pa corresponding to the torque required when clearing snow is within the permissible current values of the normal wiping operation range 90.

Figure 10A:
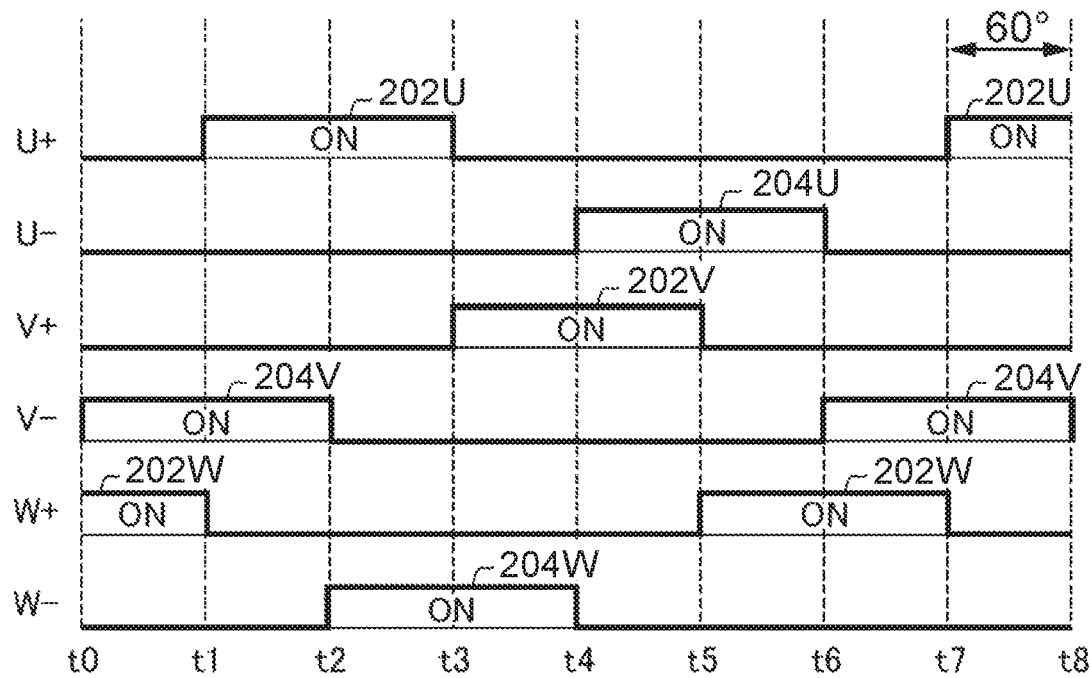
FIG. 10A is a timing chart illustrating an example of a pattern of current switch-on to coils in high torque rotation control of an output shaft of a wiper motor of a wiper device according to the second exemplary embodiment of the present disclosure.

FIG. 10A is a timing chart illustrating an example of a pattern of current switch-on in the coils 40U, 40V, 40W under high torque rotation control. Current switch-ons 202U, 202V, 202W and current switch-ons 204U, 204V, 204W illustrated to have square forms in FIG. 10A represent timings at which current switch-on is performed to the coils 40U, 40V, 40W. Although the current switch-ons 202U, 202V, 202W and the current switch-ons 204U, 204V, 204W are illustrated to have square forms in FIG. 10A and FIG. 10B, at actual current switch-on, a voltage modulated in a pulse pattern using PWM is applied to the coils 40U, 40V, 40W. Note that unit time in FIG. 10A and FIG. 10B (for example the period from a time t0 to a time t1) is the time taken for the rotor 72 to rotate through an electrical angle of 60°. The timings of current switch-on in FIG. 10A are timings corresponding to the positions of the magnetic poles of the rotor 72 as detected by the Hall sensor 70.

The FET 74W and the FET 76V are ON from the time t0 to the time t1, and current from the coil 40W to the coil 40V is switched-on. The FET 74U and the FET 76V are ON from the time t1 to the time t2, and current from the coil 40U to the coil 40V is switched-on. The FET 74U and the FET 76W are ON from the time t2 to the time t3, and current from the coil 40U to the coil 40W is switched-on. The FET 74V and the FET 76W are ON from the time t3 to the time t4, and current from the coil 40V to the coil 40W is switched-on. The FET 74V and the FET 76U are ON from the time t4 to the time t5, and current from the coil 40V to the coil 40U is switched-on. The FET 74W and the FET 76U are ON from the time t5 to the time t6, and current from the coil 40W to the coil 40U is switched-on. The FET 74W and the FET 76V are ON from the time t6 to the time t7, and current from the coil 40W to the coil 40V is switched-on. The FET 74U and the FET 76V are ON from the time t7 to the time t8, and current from the coil 40U to the coil 40V is switched-on.

Figure 10B:
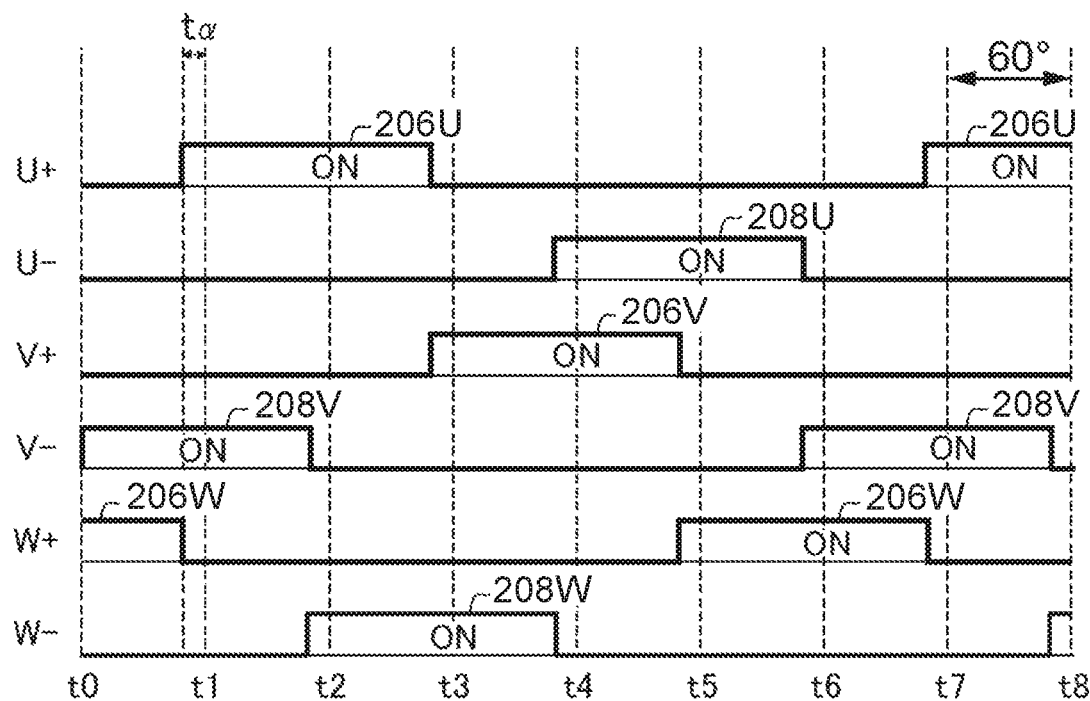
FIG. 10B is a timing chart illustrating an example of a pattern of current switch-on to coils under high rotation control of an output shaft of a wiper motor of a wiper device according to the second exemplary embodiment of the present disclosure.
Figure 12:
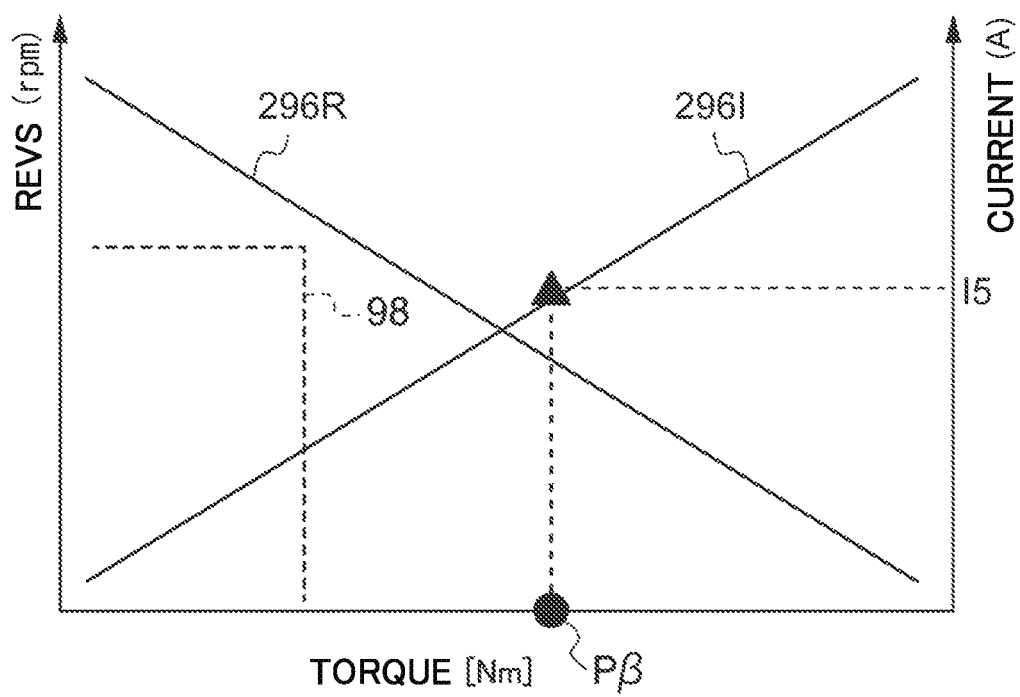
FIG. 12 is an explanatory diagram illustrating change in output shaft revs (rotation speed) and motor current with respect to torque of an output shaft of a generic brushless DC motor.

FIG. 10B is a timing chart illustrating an example of a pattern of current switch-on to the coils 40U, 40V, 40W under high rotation control. In FIG. 10B, current switch-ons 206U, 206V, 206W, 208U, 208V, 208W are performed at timings that are each earlier by tα than (advanced with respect to) the current switch-on timings of the current switch-ons 202U, 202V, 202W, 204U, 204V, 204W in FIG. 10A. Since tα differs according to the wiper motor specifications and the like, the tα is specifically decided through simulations at the design stage, or by testing using actual devices.

Effective ways to rotate output shafts at high rotation speeds with brushless DC motors generally include advancing the electrical angle of the timings of current switch-on for the respective U, V, W phases. Moreover, effective ways to suppress the motor current while securing the output shaft torque include performing current switch-on to the respective U, V, W phases at timings corresponding to the positions of the magnetic poles of the rotor 72 detected by the Hall sensor 70. In the second exemplary embodiment of the present disclosure, when the output shafts 36, 38 of the wiper motors 18, 20 are to be rotated at high speed, the current switch-on timings are advanced as illustrated in FIG. 10B, and current switch-on is performed to the respective U, V, W phases at timings corresponding to the positions of the magnetic poles of the rotor 72 detected by the Hall sensor 70 as illustrated in FIG. 10A in order to suppress the motor current while securing the output shaft torque. Note that in a case in which current switch-on is performed to the respective U, V, W phases at timings retarded with respect to the current switch-on timings illustrated in FIG. 10A, although the torque of the output shafts 36, 38 of the wiper motors 18, 20 might rise further, the motor current would increase, or in a case in which the current switch-on timings lag excessively might cause the wiper motors 18, 20 to cease to maintain rotation of the output shafts 36, 38 and step out to occur.

FIG. 11 is a flowchart illustrating an example of rotation control processing of the wiper motors 18, 20 of the wiper device according to the second exemplary embodiment of the present disclosure.

At step 700, the current value of the motor current is acquired by the current detection section 68, the substrate temperatures are acquired by the chip thermistor RT, and the rotation angles of the output shafts 36, 38 of the wiper motors 18, 20 are acquired by the rotation angle sensors 42, 44.

At step 702, determination is made as to whether or not the wiping operation by the wiper blades 30, 32 is being obstructed. At step 702, as an example, the wiping operation is determined to be obstructed when the motor current of either of the wiper motors 18, 20 is the upper limit value or higher or the lower limit value or lower, when the temperature of the substrate of either of the wiper control circuits 60, 62 has reached a predetermined value (for example 145° C.) or higher, or when the rotation angle of either of the output shafts 36, 38 detected by the rotation angle sensors 42, 44 does not change even though current switch-on is performed in the wiper motors 18, 20 (alternatively, in a case in which an angle change per unit time is a threshold value or lower). Alternatively, in addition to the above, the wiping operation may also be determined to be obstructed when the voltage of the battery 80 is an upper limit value or higher or a lower limit value or lower. Moreover, the wiping operation may also be determined to be obstructed in a case in which a difference between a rotation angle of the output shaft 36 of the wiper motor 18 and the rotation angle of the output shaft 38 of the wiper motor 20, as respectively detected by the rotation angle sensors 42, 44, reaches a predetermined value or higher. Note that the upper limit value and the lower limit value for the motor current, the threshold value for angle change per unit time, and the upper limit value and the lower limit value for the voltage of the battery 80 differ according to the rating and specification of the wiper motors 18, 20 or the specification of the wiper device, and so are specifically decided through calculations at the product design stage or by prototype testing or the like.

In a case in which determination is affirmative at step 702, high torque rotation control is performed at step 704 such that current switch-on is performed in the coils of the wiper motors 18, 20 at the current switch-on timings illustrated in FIG. 10A, and then processing returns. In a case in which determination is negative at step 702, high rotation control is performed at step 706 such that current switch-on is performed in the coils of the wiper motors 18, 20 at the current switch-on timings illustrated in FIG. 10B, and then processing returns.

As described above, in the second exemplary embodiment of the present disclosure, the timings at which current switch-on is performed in the coils of the wiper motors 18, 20 varies between a case in which a rotation speed of the output shafts 36, 38 is raised, and a case in which the torque of the output shafts 36, 38 is raised. For example, in a case in which the rotation speed of the output shafts 36, 38 is raised, by bringing forward the timings for current switch-on to the coils of the wiper motors 18, 20, current switch-on is performed in a manner appropriate to high rotation. Moreover, in a case in which the wiping operation by the wiper blades 30, 32 is obstructed or the like and it is necessary to raise the torque of the output shafts 36, 38 of the wiper motors 18, 20, current switch-on is performed in the coils at a later timing than the current switch-on timings during high rotation. This accordingly enables the torque of the output shafts 36, 38 to be raised and the wiper motors 18, 20 to be prevented from overloading.

Note that in the second exemplary embodiment of the present disclosure, although explanation has been given regarding an example of a direct-drive tandem wiper device including the wiper motor 18 of the left wiper device 14 and the wiper motor 20 of the right wiper device 16, the high torque rotation control and high rotation control described above may be applied to a wiper device in which motive force of a single wiper motor is transmitted to left and right wipers via a link mechanism.

The disclosure of Japanese Patent Application No. 2017-012213, filed on Jan. 26, 2017, and the disclosure of Japanese Patent Application No. 2017-008900, filed on Jan. 20, 2017 are incorporated in their entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A wiper device comprising:
a wiper motor that includes a rotor and a coil to generate a rotating magnetic field, and that causes a wiper blade to perform a wiping operation by rotating the rotor according to the rotating magnetic field;
a drive section that drives rotation of the wiper motor by performing current switch-on in the coil so as to generate the rotating magnetic field; and
a controller that controls the drive section by a timing for current switch-on in the coil based on at least a rotation position of the rotor, wherein:
in a case in which a speed command is for a first rotation speed, the controller controls the drive section so as to perform first rotation control in which current switch-on in the coil is performed at a timing corresponding to a rotation position of the rotor;
the controller controls the drive section so that at least one control is performed of
second rotation control in a case in which the speed command is for a second rotation speed that is faster than the first rotation speed, in which current switch-on in the coil is performed at an effective voltage that is higher than a voltage in the first rotation control and at a timing advanced in electrical angle with respect to the timing of the first rotation control, and
third rotation control in a case in which the speed command is for a third rotation speed that is slower than the first rotation speed, in which current switch-on in the coil is performed at an effective voltage that is lower than the voltage in the first rotation control and at a timing lagging in electrical angle with respect to the timing of the first rotation control;
in a case in which a difference between the second rotation speed indicated by the speed command and a present rotation speed of the wiper motor is large, the controller controls the drive section such that the effective voltage for the current switch-on to the coil is raised and the timing of the current switch-on is advanced such that the rotation speed of the wiper motor attains the rotation speed indicated by the speed command; and
in a case in which a difference between the present rotation speed of the wiper motor and the third rotation speed indicated by the speed command is large, the controller controls the drive section such that the effective voltage for the current switch-on to the coil is lowered and the timing of the current switch-on is retarded such that the rotation speed of the wiper motor attains the rotation speed indicated by the speed command.

2. The wiper device of claim 1, further comprising a temperature detection section that detects a temperature of the drive section,
wherein the controller controls the drive section such that the third rotation control is performed in a case in which the temperature has exceeded a predetermined threshold temperature during a wiping operation by the wiper blade.

3. The wiper device of claim 1, further comprising a current detection section that detects a current value of the coil, wherein the controller controls the drive section such that the third rotation control is performed in a case in which the current value is a predetermined threshold value or greater during a wiping operation by the wiper blade.

4. The wiper device of claim 1, wherein:
in the case in which the difference between the second rotation speed indicated by the speed command and the present rotation speed of the wiper motor is large, the controller controls the drive section such that the effective voltage for the current switch-on to the coil is raised in steps and the timing of the current switch-on is advanced in steps; and
in the case in which the difference between the present rotation speed of the wiper motor and the third rotation speed indicated by the speed command is large, the controller controls the drive section such that the effective voltage for the current switch-on to the coil is lowered in steps and the timing of the current switch-on is retarded in steps.

5. The wiper device of claim 1, wherein:
in a case in which a rotation speed of the wiper motor is to be raised, the controller controls the drive section so that high rotation control is performed by performing current switch-on in the coil at a timing advanced in electrical angle with respect to the timing corresponding to the rotation position of the rotor; and
in a case in which a torque of the wiper motor is to be raised, the controller controls the drive section so that high torque rotation control is performed in which an equivalent torque is obtained at a lower current than in the high rotation control by performing current switch-on in the coil at the timing corresponding to the rotation position of the rotor.

6. The wiper device of claim 5, wherein the case in which the torque of the wiper motor is to be raised corresponds to a case in which a wiping operation by the wiper blade has been obstructed.

7. The wiper device of claim 6, further comprising a current detection section that detects a current value of the coil,
wherein the controller determines that the wiping operation by the wiper blade has been obstructed in a case in which the current value has exceeded a predetermined threshold value during the wiping operation by the wiper blade.

8. The wiper device of claim 6, further comprising a temperature detection section that detects a temperature of the drive section,
wherein the controller determines that the wiping operation by the wiper blade has been obstructed in a case in which the temperature of the drive section has exceeded a predetermined threshold temperature during the wiping operation by the wiper blade.

9. The wiper device of claim 6, further comprising a rotation angle detection section that detects a rotation angle of an output shaft of the wiper motor,
wherein the controller determines that the wiping operation by the wiper blade has been obstructed in a case in which the rotation angle of the output shaft detected by the rotation angle detection section does not change during the wiping operation by the wiper blade.

* * * * *